United States Patent
Loveland

(10) Patent No.: US 9,318,010 B2
(45) Date of Patent: Apr. 19, 2016

(54) RECOGNIZABLE LOCAL ALERT FOR STOLEN OR LOST MOBILE DEVICES

(71) Applicant: Absolute Software Corporation, Vancouver (CA)

(72) Inventor: Damien Gerard Loveland, Richmond BC (CA)

(73) Assignee: Absolute Software Corporation, Vancouver BC ( * ) Notice: Subject to any disclaimer, the term of this patent is extended or adjusted under 35 U.S.C. 154(b) by 82 days.

(21) Appl. No.: 14/262,487

(22) Filed: Apr. 25, 2014

(65) Prior Publication Data

US 2015/0310714 A1    Oct. 29, 2015

(51) Int. Cl.
  *G08B 13/22* (2006.01)
  *G08B 21/22* (2006.01)
  *G08B 31/00* (2006.01)
  *G08B 13/14* (2006.01)
  *H04W 12/12* (2009.01)

(52) U.S. Cl.
  CPC ............ *G08B 13/22* (2013.01); *G08B 13/14* (2013.01); *G08B 21/22* (2013.01); *G08B 31/00* (2013.01); *H04W 12/12* (2013.01); *G08B 13/1427* (2013.01)

(58) Field of Classification Search
  CPC ........ G08B 13/22; G08B 13/14; G08B 21/22; G08B 31/00; G08B 13/1427; H04W 12/12
  USPC ..................................................... 340/539.11
  See application file for complete search history.

(56) References Cited

U.S. PATENT DOCUMENTS

| | | | | |
|---|---|---|---|---|
| 4,370,753 A | * | 1/1983 | Ehmke ................. | G08B 3/1066 340/7.34 |
| 4,999,621 A | | 3/1991 | Loeb | |
| 5,821,855 A | * | 10/1998 | Lewis ................... | G08B 25/14 340/539.16 |
| 7,135,635 B2 | | 11/2006 | Childs et al. | |
| 7,138,575 B2 | | 11/2006 | Childs, Jr. et al. | |
| 7,511,213 B2 | | 3/2009 | Childs, Jr. et al. | |
| 7,629,528 B2 | | 12/2009 | Childs, Jr. et al. | |
| 7,864,633 B2 | | 1/2011 | Holm et al. | |
| 8,073,427 B2 | | 12/2011 | Koch et al. | |
| 8,917,186 B1 | * | 12/2014 | Grant ...................... | G08B 1/08 340/3.3 |
| 8,947,230 B1 | | 2/2015 | Gettings et al. | |
| 2005/0238023 A1 | * | 10/2005 | Robertson .......... | G08B 13/2402 370/392 |
| 2006/0232409 A1 | * | 10/2006 | Gray ..................... | G08B 25/10 340/572.1 |
| 2008/0211670 A1 | * | 9/2008 | Gordon .................. | G06F 21/88 340/572.1 |
| 2011/0057797 A1 | * | 3/2011 | Parker ................... | G08B 21/22 340/568.1 |
| 2011/0115621 A1 | * | 5/2011 | Loveland ............... | G06Q 10/06 340/539.13 |
| 2011/0214143 A1 | | 9/2011 | Rits et al. | |

(Continued)

FOREIGN PATENT DOCUMENTS

WO    WO 2013154588 A1 * 10/2013 ............ H04W 64/00

*Primary Examiner* — Jennifer Mehmood
*Assistant Examiner* — Omar Casillashernande
(74) *Attorney, Agent, or Firm* — Knobbe, Martens, Olson & Bear, LLP

(57) ABSTRACT

A system is disclosed in which an electronic device of a user emits an identifiable alert as a result of a trigger indicating loss or theft, or probability or risk of loss or theft. Alerts may be acoustic, either audible or inaudible and may be disguised. Alerts may also be short range radio signals. Other, local electronic devices of users may detect the alert and react by transmitting their location and the information in the alert to a monitoring center. The monitoring center may respond by sending a silence code or identification information to the device detecting the alert.

16 Claims, 2 Drawing Sheets

(56) References Cited

U.S. PATENT DOCUMENTS

| | | | |
|---|---|---|---|
| 2012/0003991 A1* | 1/2012 | Loveland | G01S 5/02 455/456.1 |
| 2012/0188064 A1 | 7/2012 | Mahaffey et al. | |
| 2013/0101127 A1 | 4/2013 | Buchmann | |
| 2014/0077932 A1* | 3/2014 | Rooyakkers | G06Q 10/00 340/7.51 |

* cited by examiner

RECOGNIZABLE LOCAL ALERT FOR STOLEN OR LOST MOBILE DEVICES

CROSS-REFERENCE TO RELATED APPLICATIONS

The disclosures of U.S. application Ser. No. 12/878,927, filed Sep. 9, 2010, and U.S. provisional application No. 61/240,993, filed Sep. 9, 2009, are hereby incorporated by reference as if fully set forth herein.

TECHNICAL FIELD

The present disclosure relates to the protection of electronic devices from loss or theft.

BACKGROUND

Personal electronic computing or communications devices are often lost or stolen. Since proprietary information is routinely stored on such devices, the need to protect such proprietary or sensitive data and to recover such devices is self-evident.

Laptops, and increasingly other electronic devices such as cell phones, PDAs, smart phones (e.g. Blackberry™, iPhone™), memory sticks, personal media devices (e.g. iPod™), gaming devices, tablet computers, electronic books and personal computers, are often remotely tracked so that they can be recovered in the event of theft. Such tracking may be effected by sending location information to a remote storage site, an email server or a personal mobile electronic device.

After loss or theft, owners sometimes remotely trigger a device to emit a loud alarm, either to assist the owner to locate it, if lost, or to deter a thief from keeping it, if it has been stolen. As is the case with car alarms and house alarms, such an alarm may easily be ignored unless heard by the owner of the device.

SUMMARY

This summary is not an extensive overview intended to delineate the scope of the subject matter that is described and claimed herein. The summary presents aspects of the subject matter in a simplified form to provide a basic understanding thereof, as a prelude to the detailed description that is presented below. Neither this summary nor the following detailed description purports to define or limit the invention; the invention is defined only by the claims.

The present disclosure relates to systems and methods for emitting, detecting and resetting identifiable alerts from stolen or lost electronic devices, devices that are potentially lost or stolen, or devices that are at risk of being stolen. In one embodiment, upon local or remote triggering, a recognizable alert can be emitted acoustically from a device in order it may be heard in its vicinity, possibly leading to retrieval of the device as a result. A finder of the device may be able to return the device to its rightful owner since the alert contains information identifying the device or an owner of the device. In another embodiment, a recognizable alert can be transmitted from one device to one or more other devices in the same vicinity in order to provide an enhanced awareness that there is a lost or stolen device nearby. Devices receiving such transmission may be, for example, cell phones or the like carried by the owner or legitimate user of the lost or stolen device, or devices of the sort typically used or monitored by security organizations or personnel. Alerts may be transmitted audibly or inaudibly, whether acoustically or otherwise, to other devices in the vicinity, the alert comprising an identifying signal in each case. Identification of a lost or stolen device may be achieved without obtaining possession of the device. A trigger for the alert may be an actual loss or theft, a probable loss or theft, or an elevated risk of loss or theft. Informing others of an actual or potential loss or theft serves to help recover the device as well as protecting the devices belonging to other people by increasing their awareness of the problem.

BRIEF DESCRIPTION OF THE DRAWINGS

For a fuller understanding of the nature and advantages of the disclosed subject matter, as well as the preferred mode of use thereof, reference should be made to the following detailed description, read in conjunction with the accompanying drawings. In the drawings, like reference numerals designate like or similar steps or parts.

DETAILED DESCRIPTION OF SPECIFIC EMBODIMENTS

A. Terminology

Figure 1:
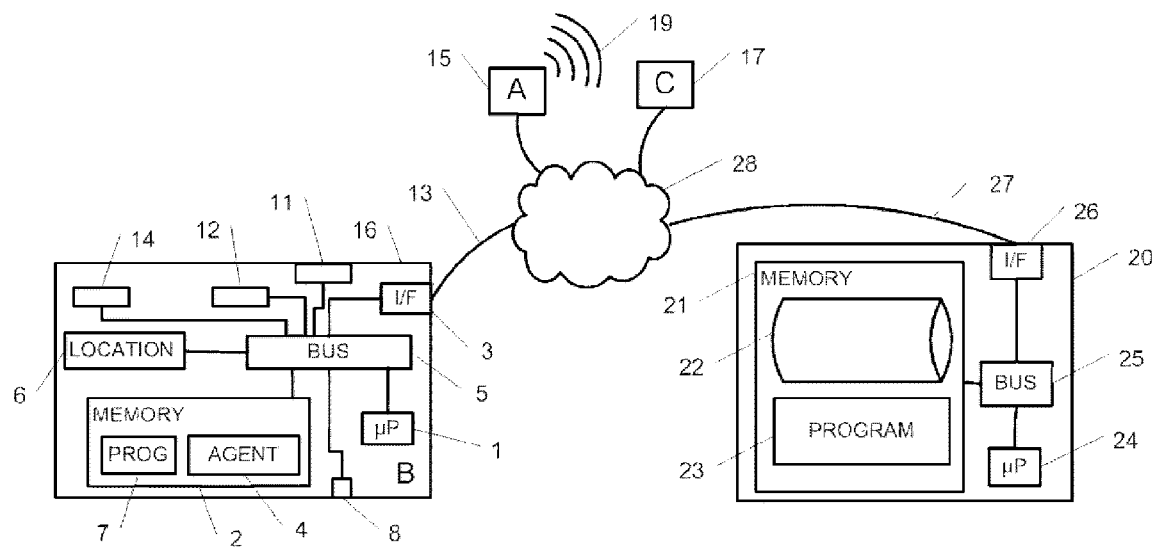
FIG. 1 is a schematic functional block diagram of a system for the transmission of alerts to nearby electronic devices in accordance with an embodiment of the disclosed subject matter.

Agent. As used herein, an agent is a software, hardware or firmware agent that is ideally persistent and stealthy, and that resides in a computer or other electronic device. The agent provides servicing functions which require communication with a remote server. The agent is tamper resistant and can be enabled for supporting and/or providing various services such as data delete, firewall protection, data encryption, location tracking, message notification, software deployment and updates. An illustrative embodiment of an agent is found in the commercially available product Computrace Agent™. The technology underlying the Computrace Agent™. has been disclosed and patented in the U.S. and other countries, which patents have been commonly assigned to Absolute Software Corporation. See, for example, U.S. Pat. Nos. 5,715,174; 5,764,892; 5,802,280; 6,244,758; 6,269,392; 6,300,863; 6,507,914; 7,818,803 and related foreign patents. Details of the persistent function of an agent are disclosed in U.S. Patent Application Publication Nos. US2005/0216757 and U.S. Pat. No. 8,418,226. The technical disclosures of these documents are fully incorporated by reference as if fully set forth herein. It is feasible to use an equivalent agent to the Computrace Agent™, or less preferably an alternative agent with less functionality could be used. For the purposes of the present disclosure, the minimum functional attribute of the agent is to facilitate communications between the electronic device and a monitoring center or other remote computer or server. Communications may be initiated by the agent, by the monitoring center, or by both.

Host. This is the electronic device to be protected. Examples of a host include a laptop, cell phone, PDA, smart phone (e.g. Blackberry™, iPhone™), memory stick, personal media device (e.g. iPod™), gaming device, personal computer, tablet computer, electronic book and netbook. The agent resides in the host.

Monitoring Center. This is a computer-based monitoring system, such as a guardian server or other computer or server that the agent communicates with or sends a message to. It may be an email server or it may be a distribution of servers or other computers. For example, provided an internet connection is available to the host, an agent may call the monitoring center once a day (or at some other selected suitable interval) to report the location of the host, download software upgrades if there are any and repair any security modules that are or should be installed on the host. The interval between calls may be modified (e.g. reduced) if a host moves into a high risk area from a low risk area, or if the device is lost or stolen. In the embodiments disclosed herein, the agent sends host identification and location information to remote electronic storage located in the monitoring center, and/or any other data desired to be transferred. Communication to the monitoring center may be, for example, via the internet (wired or wireless), via a wired or wireless telephone network, via cable or via satellite. The functions of a monitoring center may be incorporated into or associated with an electronic social network server. The monitoring center may receive notifications from owners of electronic devices that they have been lost or stolen, and as a result, the monitoring center may transmit a message to the lost or stolen electronic device that initiates some kind of an action. The action may be to lock the device, to sound an alarm, to delete data and/or to provide location information, for example.

The detailed descriptions within are presented largely in terms of methods or processes, symbolic representations of operations, functionalities and features of the invention. These method descriptions and representations are the means used by those skilled in the art to most effectively convey the substance of their work to others skilled in the art. A software implemented method or process is here, and generally, conceived to be a self-consistent sequence of steps leading to a desired result. These steps involve physical manipulations of physical quantities. Often, but not necessarily, these quantities take the form of electrical or magnetic signals capable of being stored, transferred, combined, compared, and otherwise manipulated. It will be further appreciated that the line between hardware, software and firmware is not always sharp, it being understood by those skilled in the art that software implemented processes may be embodied in hardware, firmware, or software, in the form of coded instructions such as in microcode and/or in stored programming instructions. In general, unless otherwise indicated, singular elements may be in the plural and vice versa with no loss of generality. The use of the masculine can refer to masculine, feminine or both. Drawings are not to scale.

B. Exemplary Embodiment

A schematic functional block diagram of a preferred embodiment is shown in FIG. 1. In many parts of the following detailed description, the subject matter has been explained in relation to stolen devices, but as would of course be evident to those of skill in the art, it applies equally as well to devices that are lost.

The system is intended to protect host devices such as devices 15, 16 and 17, labeled A, B and C respectively. These devices may all be different types of devices, but all have features in common which are described in relation to device B below. A host electronic device B 16 such as a smart phone generally contains a processor 1 for processing computer readable instructions, such as those stored in a memory 2, and reading data from and writing data to the memory 2. An agent 4 is located in electronic memory 2 in the host device 16. The memory 2 may be divided among different components and/or different types of memory, and the agent 4 may be resident in more than one portion of memory 2.

In the device 16, there is also a location module 6, such as a GPS, D-GPS or an A-GPS module, or some other module capable of performing location determination or assisting with it. The locating module 6 may be a component or module separate from the memory 2 as shown in FIG. 1, or it may be a module contained in or partially contained in the memory 2 of the electronic host device 16. There may be one, two or more locating modules 6, each operating on a different principle or one acting as a backup for another. The location module 6 might communicate with another system that has a WiFi database that can provision the location back to the device. Additionally, the public IP address of a device may be inferred by a remote system, which can provision the approximate location of the device back to the device. The location module 6 and other internal components or modules of the host device 16 are connected via a bus 5 to the processor 1.

The electronic host device 16 also includes an interface 3 for connecting via link 13 to the internet 28 or other communication network. It should be appreciated that a host device 16 that connects to the internet 28 may in some cases be considered part of the internet 28. The link 13 to the internet 28 or telecommunications network may be wired or wireless, or both.

The host 16 also includes a speaker 12 and microphone 14. If the host device 16 is lost or stolen, it may be triggered to emit an acoustic alarm via the speaker 12. If the host device 16 is within acoustic range of a lost or stolen device that is emitting an acoustic alarm, then the microphone 14 can be used to detect and record the alarm. For example, host device A 15 is shown emitting a signal 19 that is detected by device C 17. The device 16 may comprise a Bluetooth module 11 for communicating via short distance radio signals with other devices 15, 17. The host 16 may also include one or more sensors 8 for detecting movement of the device, acceleration of the device, and/or parameters of the environment in which the host 16 is located.

The agent 4 can communicate regularly, non-periodically, randomly, semi-randomly or according to triggers, to monitoring center 20 via the internet 28, via some other telecommunications network or via a combination of these. Short Message Service (SMS) messaging can be used for all or some of the communications, for example.

The agent 4 sends data, which identifies the host and may include location information, to a monitoring center 20 to be stored in remote storage device(s) 21. The agent may interact with computer readable instructions in the form of a program 7 stored in the memory 2 of the device 16, the program providing the agent with the necessary data that is to be communicated, or controlling the components in the device according to instructions received by the agent from the monitoring center. Location and/or host identification data may optionally be encrypted for privacy reasons. The monitoring center 20 may be a server which contains an interface 26 for connected via connection 27 to the network 28, a bus 25 via which components internal to the server communicate and a processor 24 for processing computer readable instructions in the memory 21. Examples of instructions may be those included in one or more program modules 23 for storing and/or encrypting incoming identification and location data from multiple host devices 15, 16, 17, and for retrieving host identification data, host location data and theft records from one or more databases 22. In some embodiments, the server may be formed from multiple distinct computers or computing devices that communicate over a network. The monitoring center may be, or comprise, a mobile device, such as a smart phone, which may belong to a person known to the owner of a protected device 15, 16 or 17.

In the case of theft or loss of a protected electronic device 15, the user or owner of the device 15 reports it to the monitoring center 20. The monitoring center 20 may record location information for the stolen device 15 in, for example, a database 22. Such a database can store the identification of a device, data on the device, its location and the time it was at that location, and optionally encrypt some or all of this information. The server 20 may also have information relating to the location of other devices 16, 17 which are also being monitored for security reasons.

Upon the monitoring center 20 being notified of the loss or theft of the device, an alert signal is transmitted to the lost or stolen device 15. The monitoring center 20 may initiate this communication, or it may transmit the information in a call initiated by the lost or stolen device 15. Upon receiving the alert signal, the lost or stolen device 15 may take various actions, such as switching off, locking down, reporting location, reporting location more frequently, transmitting data, recording screenshots, taking and transmitting photos, recording and transmitting sounds, deleting files, etc. One or more modules of the program 7, when processed by the processor 1, may cause the device 15 to take the various actions specified above. Alternately, the agent 4 may take one or more of the actions, or the actions may be shared between the program 7 and the agent 4.

One of the actions that the device 15 may be instructed to take is to emit an acoustic alert 19. Such an alert 19 may be emitted under control of the agent or a module in the program 7 that is initiated by the agent. The acoustic alert 19 is preferably unique to the device 15, such that the device can be acoustically identified. For example, the user of the phone may have recorded a message to be played in the event that the alert signal is transmitted to it. Such a message may be audible, such as, "Hey! This is Celia's phone. I'm lost. Please take me to me owner!" As well as a deterrent to being kept by an unauthorized owner, people known to the owner who are in hearing distance will be able to identify the phone and perhaps retrieve it and return it to the owner. The acoustic alert 19 may be emitted repeatedly, intermittently or sporadically, until it is cancelled by the owner or by a trusted finder entering a cancel code. The task of emitting alerts, and the task of listing for alerts emitted by other devices, may be performed by (or under the control of) the agent 4 and/or other program code 7 executed by the devices 15-17.

Figure 2:
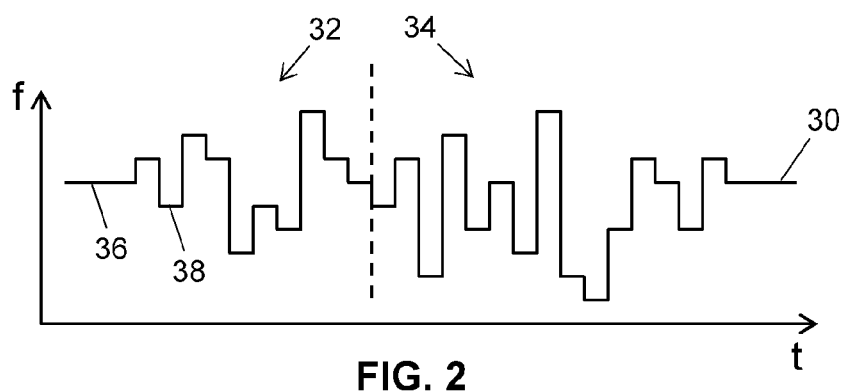
FIG. 2 is a graph of a tone-code alert emitted by a lost or stolen electronic device.

The acoustic alert may be made unique by including in it a unique series of tones. Nearby devices, such as device 17, that are with acoustic range may analyze the tones to determine an identification code associated with the device. Information, including identifying information, coded in the alert is discernable by the nearby devices, such that they can detect the alert, recognize that it is an alert, and take action based upon that recognition. Such action may, for example, be the extraction of the coded information from the alert and, optionally, transmission of the information to a remote server. In some cases, the information may be decoded at the server. FIG. 2 shows an example of a tone code 30 drawn on a graph of frequency versus time. The sequences of tones may be selected such that false positive detection events are very unlikely. For example, a tone sequence may include a checksum for validating sequence, and/or may include or follow a pattern that is very unlikely to occur by chance. The uniqueness of the tones should be sufficient to identify the device 15 and/or the owner of the device 15. It could be envisaged that there are embodiments in which an owner (or equivalently, an authorized user) will use the same acoustic alert for identifying more than one of the owner's devices. In these cases, the alert would be unique to the owner rather than a specific device.

Alternately, a nearby device 17 may record the acoustic signal comprising the tone code, transmit it (or some representation of it or some portion of it) to a remote server, where it is analyzed, and receive a message with the details of the owner. The tone code 30 may comprise a non-unique header tone series 32, which may be sounded before each emission of a tone code 34, such that a nearby device 17 can recognize that a tone code 34 is about to follow. The duration of the tones within the code may be different, for example, tone 36 is longer than tone 38. Such functioning of the device 17 may be achieved by running of the program 7, for example, or by a combination of the agent 4 and the program.

Devices 17 listen continuously or intermittently. If a header tone 32 is used, then devices 17 do not need to listen continuously, and may listen for brief durations separated by a time interval that is shorter than the length of the header tone. That way, at least part of the header tone will be detected during a brief listening duration and, if detected, it will trigger the device 17 to continue listening in order to capture the full tone code 30. Whether continuous or intermittent, the listening function may be switched on and off manually by the user in some embodiments, depending on the user's desire to create a listening post. Alternately, the listening function may be automatically switched on when the device 17 enters a crowded area, or an area known or detected to have a high risk of theft or loss. This is possible since the device 17 can be location-aware and can communicate with the monitoring center 20, which may store in its database 22 current and historical locations of devices and their losses and thefts.

In some embodiments, the lost or stolen device 15 may, under control of or triggered by agent 4 or program 7, emit multiple types of alert messages or signals, such as two or more of the following: (1) an encoded acoustic alert message, such as a tone code, that is encoded with identifying information corresponding to the device 15; (2) a voice message, which may be unique to the device 15 and/or its owner; (3) a radio frequency alert message (which may, for example, be sent as a Bluetooth transmission or other short-distance radio transmission) containing identifying information corresponding to the device 15. In some cases, the type and/or content of the alert messages may depend on whether the device 15 is reported as lost versus stolen; for example, different voice messages may be played by the device dependent upon whether it is reported as lost versus stolen.

The alert 19 is a local alert, in that it is emitted with a power low enough for other devices in its vicinity to detect the alert without devices further away being able to detect it. This way, energy of the battery can be conserved. In some embodiments, the alert can be repeated from time to time, and the power or volume of subsequent alerts can be higher than previously emitted alerts in order to be detectable by a larger number of local devices.

The tone code or other alert message may, in some embodiments, include encoded information regarding the recent movement or location history of the device 15. For example, the alert message may include encoded information that specifies whether the device 15 is stationary, how long it has been stationary, the speed and direction at which it is moving, etc. The agent 4 or other program code 7 that runs on the lost or stolen device 15 may incorporate these and other types of information into the alert signals. This information, once decoded from an alert signal by another device or the monitoring center, can be communicated to the user of the device 15 and/or to investigative personnel and used to locate and recover the lost or stolen device 15.

The lost or stolen device 15 may, in some embodiments, emit the alert signal (or continue doing so) even if some or all of its RF communication functions are disabled. For example, even if a thief disables the telephone and WI-FI functions of a stolen smartphone, the smartphone may continue to emit an audible (e.g. acoustic in the range of human hearing) or non-audible (e.g., Bluetooth or acoustic in the ultrasound range) alert signal.

In some embodiments, the cancel code for muting the alarm may be supplied to the device that detects the alarm. The cancel code may be supplied conditionally, for example, it may be supplied only if the finder belongs to a friend or contact in the device 15 owner's social network. A circle or group of friends in a social network of the device owner may automatically be deemed to own trusted devices, to which the cancel code will be supplied, or there may be an option for users to individually select those friends who are to be deemed to have trusted devices.

Figure 3:
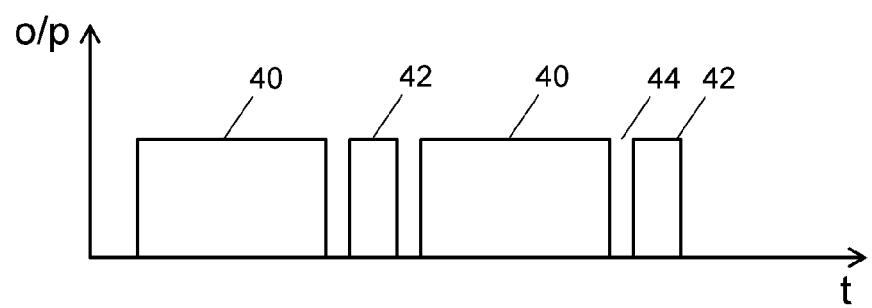
FIG. 3 is a graph of a two-part alert emitted by a lost or stolen electronic device.

The acoustic alert 19 may include a non-unique (or non-identifying) part, such as an alarm bell, other tones or a screech. In FIG. 3, showing a graph of acoustic output versus time, a non-unique part 40 may be repeated alternately with the unique (identifying) part 42. There may or may not be a gap 44 between the non-unique parts 40 and unique parts 42. The unique part, for example, if it is a tone code, may be sounded rapidly enough that people hearing it would consider it to be a generic alarm rather than a coded alarm. Nearby devices 17, however, would be able to record such a tone code for analysis. A nearby device 17 may be configured to automatically record sounds, analyze them and take further action if a tone code is detected. The acoustic alert, if audible, may be disguised as a ring tone, it may be a music clip or another suitable format.

In one variation, a nearby device 17 that detects a tone code 19 may supply its location to the monitoring center 20 as well as a recording or other representation of the detected tone code. The monitoring center may send a receipt signal back to device 17. The tone code and location may be supplied immediately, or as soon as there is an available connection to a network via which they can be sent. This will help the location of the lost device 15 be monitored and recorded, for example if the lost device loses its communication link with the monitoring center, or if the location device 6 within the lost device 15 is compromised or not working at is maximum accuracy. This could arise if, for example, the GPS location function is not being used due to a dwindling battery life in the lost or stolen device 15. This will help locate a lost device 15 when passersby hear the alarm but take no action, provided they have configured their own device 17 to automatically take action when detecting a tone code alarm.

Information regarding losses or thefts reported to the monitoring center 20 may be transmitted from the monitoring center to other, neighboring devices (e.g. 16) which may be out of range of the alert emitted by a lost or stolen device 15. These neighboring devices 16 may display or otherwise output an alert message indicating that a lost or stolen device 15 is nearby. The owner and/or user of such device(s) 16 can thereby be alerted to the presence of a lost or stolen device 15. The monitoring center may identify the nearby devices 16 using device location data for the devices 16 stored in the database 22. As stolen devices 15 can be configured to report their location frequently (e.g. every minute, 5 minutes, ¼ hour), the database 22 is continually up-to date, or as up-to-date as possible taking into account that the devices 15 must have power and a communication link to the monitoring center 20. As a result, alerts relating to real-time or near real-time information may be given to the users of devices 16, 17 to indicate to them that they are in an area of elevated risk of theft, even though one or more of them may already have detected the alert from device 15. The size of the area that is taken into account for risk assessment can be varied. It can be varied automatically, or it can be dependent on the precision at which location coordinates can be detected. A user could set the size of the risk zone to be taken into account. The size of the zone could be defined as an area within a certain distance of the device to be alerted. For example, the distance could be 10 m, 100 m, 500 m, 2 km, or other distance.

A protected device 15 may be configured to silently share any alerts it receives with a neighboring device 17, which may be connectable to the protected device 15 using short distance radio transmission, such as via Bluetooth communication links. For example, devices may include a Bluetooth module 11. Device 17 may belong to the same person who owns or uses device 15, or a different person. The stolen device 15 communicates via Bluetooth to a group of one or more other devices 17 that are in the range of the Bluetooth signal. The device 15 is aware that it has been stolen, either by auto-detection, or by it being informed by the monitoring center 20 after being reported stolen by its owner or legitimate user. It transmits an alert and/or a 'help' signal to the other device 17, where the signal contains identifiable and/or descriptive information about the device 15. The descriptive information could be retrieved from the monitoring center 20, or from a social network server, and could include information uploaded there by the owner of the stolen device 15 prior to travelling. Such descriptive information might be used to create a message that reads, "Celia's device is lost! It's a laptop in a blue shoulder bag with a red maple leaf". A device 17 that receives this message may be one that is used by security personal, for example in an airport, or it may belong to someone in the same social network group as the owner of the lost/stolen device 15.

Alerts may be based on auto-detection of theft. For example, a device may monitor for triggers of likely theft, such as repeated incorrect passwords attempts, a different location, increased separation from another electronic device or unusual movements. Unusual movements may be detected by one or more sensors 9 such as accelerometers installed in the device. That way, if an owner is unaware that his device 15 is missing, then an acoustic alarm may still be generated. Furthermore, this may be achieved without prior communication of the theft or loss to the monitoring center 20. In some cases, there may be some borderline cases where the self determination of theft or loss has some probability of being incorrect. In these cases, the device 15 may still be triggered to sound an alarm, but it may be a different alarm. A different alarm may be, for example, an audible, verbal message such as, "Hey! Celia, are you there?" or it may be a tonal alarm that is sounded only once rather than repeatedly. If a cancel code or equivalent is not entered, or equivalent action is not taken that identifies the rightful owner or user to the device, within a certain time, then the full alarm may be sounded.

In some embodiments the acoustic alert emitted by the device may be an ultrasonic alert, and other devices may be configured with ultrasonic transducers for detecting such ultrasonic alerts. Ultrasonic transducers may be included in such devices separately from the more usual microphones and speakers, to emit and detect ultrasound. In some embodiments, the operating frequency range of microphones and speakers may extend into the ultrasound range. In some cases, the frequency of the acoustic alert may be just above the maximum audible limit for all but the youngest people, in which case standard microphones and speakers may be used.

In some embodiments the lost or stolen mobile device may be configured to output an alert signal that includes both audible and inaudible (e.g., ultrasonic or RF) components. The audible component may include a human-perceptible voice message or alarm sound intended to draw the attention of nearby individuals. The inaudible component may include encoded information (such as an identifier of the device or its owner) that can be extracted by a nearby device and forwarded to the monitoring center.

In some cases, the information encoded in the audible or inaudible alert signal (or an inaudible component of the alert signal) may include a command or set of instructions to be executed by a nearby device that detects the alert signal. For example, the alert signal may instruct the nearby device to send a text message or email message to a designated mobile number or email address, or may instruct the nearby device to display a designated message (which may, for example, specify the lost/stolen device's owner).

Figure 4:
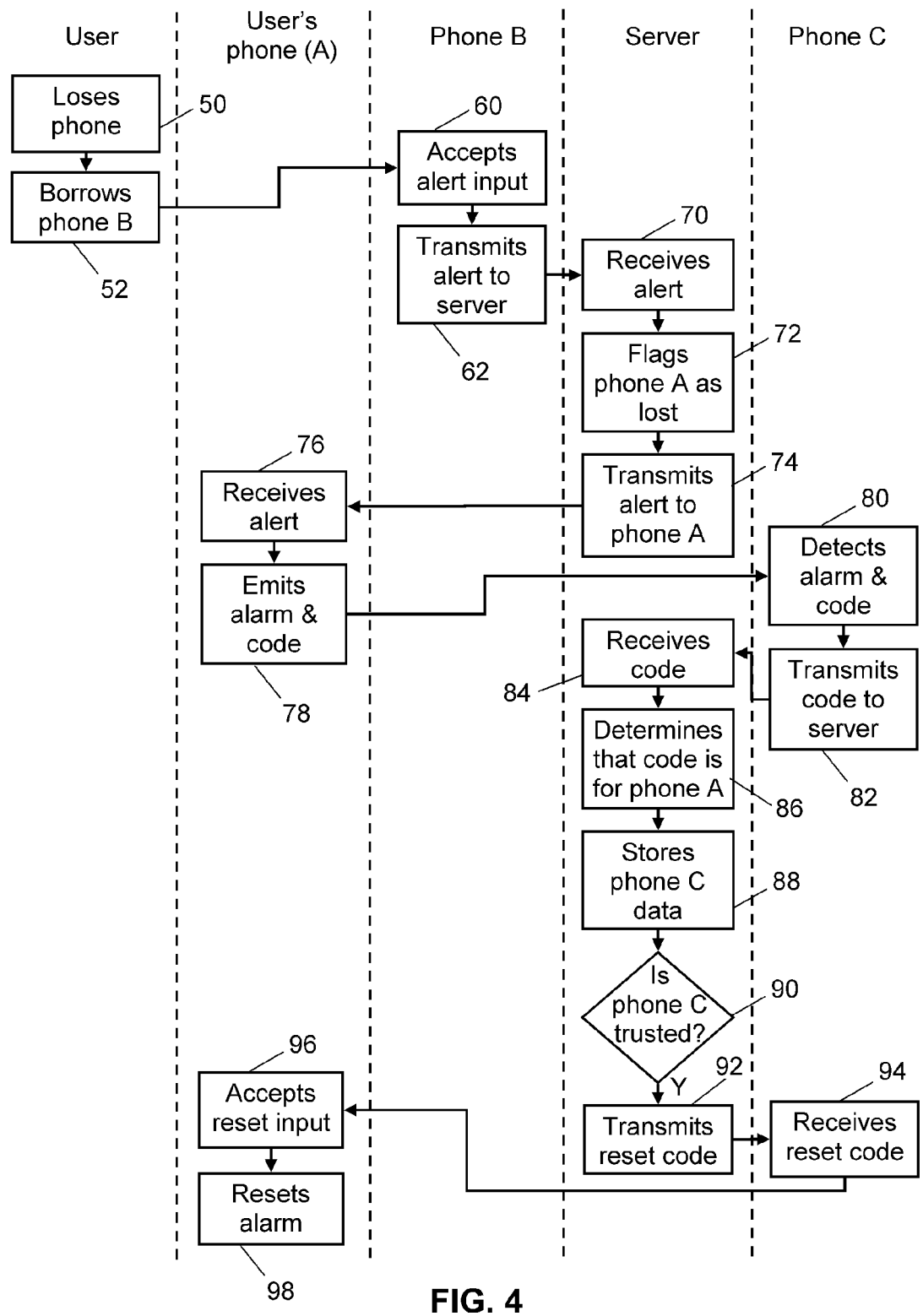
FIG. 4 is a functional flow diagram schematically representing the alert transmission, identification and resetting as carried out by the system of FIG. 1.

Referring to FIG. 4, a functional flow diagram is shown schematically representing the alert transmission, identification and resetting as carried out by the system in one embodiment. FIG. 4 is divided into five columns, each representing the steps taken by a particular actor or device. For example, a user, in step 50, loses his phone, and upon realizing this he borrows 52 a phone, Phone B, from a friend. The user uses Phone B to enter an input that indicates that his phone (Phone A) is lost. Phone B may be a smart phone, for example, that can access a webpage via which the input can be received 60. Phone B then transmits 62 the notification of the alert to the server. The telephone number of Phone B may be transmitted to and stored by the monitoring center, and later supplied to another device that assists in finding Phone A. The server receives 70 the alert, flags 72 Phone A as lost in its database and transmits 74 the alert to Phone A. Phone A then receives 76 the alert and emits 78 an alarm, which may include a tone code. In the vicinity of Phone A, another phone, Phone C, detects 80 the alarm and code emitted by Phone A and then transmits 82 it or the code contained within it to the server. The server receives 84 the code and determines 86 the phone that the code corresponds to, which is Phone A. The server stores 88 data relating to phone C in its database, in a relation to Phone A. Such data may include the number, identification and/or location of Phone C. The server then determines 90 whether Phone C is trusted, i.e. whether it belongs to security personnel or a member of the user's social network. If Phone C be trusted, the server transmits 92 a reset code to Phone C, which when received 94 by Phone C may be used for silencing the alarm being emitted by Phone A. If the reset code is used, Phone A accepts 96 its input, presumably by the owner of Phone C, and then resets 98 the alarm. (In some embodiments, the reset code may alternatively be conveyed from Phone C to Phone A via an RF (e.g., Bluetooth) or acoustic transmission, or via a bar code or QR code or other bar code that is displayed on Phone C and scanned by Phone A.) The owner of Phone C can then get in touch with the owner of Phone A and return it, which may be facilitated by the server sending to Phone C the telephone number of Phone B that was used to inform the monitoring center of the loss in the first place.

Steps in the flowcharts may be performed in a different order to that illustrated, or they may be combined where shown separately. The illustrated steps performed by the phones and server may be performed under the control of program code executed by such devices or systems.

All of the user-device-side functionality described herein may, in some embodiments, be included in a mobile application that can be installed on smartphones, tablets, and/or other types of user devices. The mobile application, when installed on a mobile device, may enable the end user to adjust various settings, including settings that specify some or all of the following: (1) the voice message, if any, to be output by the mobile device when it is reported as lost or stolen, (2) the type or types of triggers that will cause the mobile device to emit an alert signal; (3) when and/or where the mobile device is to listen, as an alert monitoring agent, for alert signals from other mobile devices, (5) other mobile devices that are to be treated as "trusted," (6) other users whose devices are to be treated as trusted. In some cases, users may be given an incentive (monetary or otherwise) for enabling their respective mobile devices to be used as alert monitoring agents that listen for alert messages from other devices. For example, a service fee charged to the user may be reduced if, or in proportion to the amount that, the user enables his or her device to be used as an alert monitoring agent. The user-device-side functionality may alternatively be included in the operating system of the mobile device, or in another type of component.

The present description is of the best presently contemplated mode of carrying out the subject matter disclosed and claimed herein. The description is made for the purpose of illustrating the general principles of the subject matter and not be taken in a limiting sense; the subject matter can find utility in a variety of implementations without departing from the scope of the disclosure made, as will be apparent to those of skill in the art from an understanding of the principles that underlie the subject matter.

The invention claimed is:

1. A processor-implemented method for emitting an alert from a mobile electronic device, comprising:
    receiving in the mobile electronic device a trigger; and
    at least partly in response to the trigger, emitting from the mobile electronic device an acoustic alert that includes encoded information that identifies the mobile electronic device,
    wherein said acoustic alert comprises a header tone series that does not identify the mobile electronic device, followed by a tone code that identifies the mobile electronic device;
    wherein said information is discernable by a further electronic device that is local to the mobile electronic device; and
    wherein the trigger represents a loss, theft, likelihood of loss, or likelihood of theft of the mobile electronic device.

2. The method according to claim 1, wherein the trigger is received from a remote transmission to the mobile electronic device.

3. The method according to claim 1, wherein the trigger is automatically determined by the mobile electronic device.

4. The method according to claim 1, wherein the acoustic alert has encoded therein a checksum.

5. The method according to claim 1, wherein the tone code is shorter than the header tone series.

6. The method according to claim 1, wherein the acoustic alert is inaudible.

7. The method of claim 1, wherein the information specifies one or more of:
    whether the mobile electronic device is stationary;
    how long the mobile electronic device has been stationary;

a speed at which the mobile electronic device is moving; and a direction in which the mobile electronic device is moving.

8. The method according to claim 1, wherein the acoustic alert is emitted repeatedly.

9. A mobile electronic device comprising a processor and a memory, the memory comprising computer readable instructions that when executed by the processor cause the mobile electronic device to at least:

detect a trigger event that represents a loss, theft, likelihood of loss, likelihood of theft, risk of loss or risk of theft of the mobile electronic device; and at least partly in response to the trigger event, emit an acoustic alert for reception by a further electronic device that is local to the mobile electronic device;

wherein said acoustic alert comprises a first tone sequence that does not identify the mobile electronic device and a second tone sequence that identifies the mobile electronic device; and wherein said information is discernable by the further electronic device.

10. A system for facilitating recovery of a lost or stolen mobile device, the system comprising:

a server system comprising one or more physical computers, the server system responsive to a reported theft or loss of a first mobile electronic device by causing the first mobile electronic device to emit an identifying alert signal that is capable of being detected by other mobile electronic devices that are in a vicinity of the first mobile electronic device; and an executable component that runs on a second mobile electronic device, said executable component configured to cause the second mobile electronic device to detect the identifying alert signal emitted by the first mobile electronic device, to extract an identifier of the first mobile electronic device from the identifying alert signal and to send the extracted identifier of the first mobile electronic device to the server system, wherein the identifying alert signal is an acoustic alert signal that includes a header tone series that does not identify the first mobile electronic device followed by a tone code that identifies the first mobile electronic device.

11. The system of claim 10, wherein the executable component instructs the second mobile electronic device to report to the server system a location at which the identifying alert signal was detected.

12. The system of claim 10, wherein the server system is programmed to respond to a reported detection by the second mobile electronic device of the identifying alert signal by at least:

determining whether the second mobile electronic device is trusted; and when the second mobile electronic device is determined to be trusted, transmitting to the second mobile electronic device a code for deactivating the alert signal on the first mobile electronic device.

13. The system of claim 12, wherein the server system is programmed to determine whether the second mobile electronic device is trusted at least partly by determining whether the second mobile electronic device is associated with a member of a social network of a user of the first mobile electronic device.

14. The system of claim 10, wherein the first and second mobile electronic devices are smartphones.

15. A non-transitory storage medium that stores executable program code that instructs a first mobile device of a user to at least:

listen for alert signals emitted by other mobile devices; and in response to detecting an alert signal emitted by a second mobile device, extract an identifier of the second mobile device from the alert signal and transmit the identifier of the second mobile device to a server system together with location information corresponding to an alert detection location, wherein the alert signal is an acoustic alert signal that includes a header tone series that does not identify the second mobile device and a tone code that identifies the second mobile device.

16. The non-transitory storage medium of claim 15, wherein the executable program code additionally instructs the first mobile device to respond to a trigger event associated with a theft or loss of the first mobile device by outputting an identifying alert signal for detection by another mobile device.

* * * * *